US012091212B2

(12) United States Patent
Chen et al.

(10) Patent No.: US 12,091,212 B2
(45) Date of Patent: Sep. 17, 2024

(54) PACKAGING ASSEMBLY

(71) Applicant: Zhuhai Ninestar Management Co., Ltd., Guangdong (CN)

(72) Inventors: Weijian Chen, Guangdong (CN); Huafeng Zhang, Guangdong (CN)

(73) Assignee: Zhuhai Ninestar Management Co., Ltd., Guangdong (CN)

( * ) Notice: Subject to any disclaimer, the term of this patent is extended or adjusted under 35 U.S.C. 154(b) by 155 days.

(21) Appl. No.: 17/791,030

(22) PCT Filed: Jun. 15, 2021

(86) PCT No.: PCT/CN2021/099987
§ 371 (c)(1),
(2) Date: Jul. 6, 2022

(87) PCT Pub. No.: WO2022/017067
PCT Pub. Date: Jan. 27, 2022

(65) Prior Publication Data

US 2023/0022479 A1 Jan. 26, 2023

(30) Foreign Application Priority Data

Jul. 23, 2020 (CN) ........................ 202021469672.4

(51) Int. Cl.
*B41J 2/175* (2006.01)
*B65D 25/04* (2006.01)
(Continued)

(52) U.S. Cl.
CPC ........ *B65D 25/107* (2013.01); *B41J 2/17503* (2013.01); *B65D 25/04* (2013.01); *B65D 25/54* (2013.01)

(58) Field of Classification Search
CPC ...................................................... B41J 2/1752
See application file for complete search history.

(56) References Cited

U.S. PATENT DOCUMENTS

| | | | |
|---|---|---|---|
| 5,381,172 | A | 1/1995 | Ujita et al. |
| 6,135,289 | A | 10/2000 | Miller |

(Continued)

FOREIGN PATENT DOCUMENTS

| | | |
|---|---|---|
| CN | 201043055 | 4/2008 |
| CN | 102582271 | 7/2012 |

(Continued)

OTHER PUBLICATIONS

Extended European Search Report for European Patent Application No. 21846682.9 dated Nov. 10, 2023.

(Continued)

*Primary Examiner* — Shelby L Fidler
(74) *Attorney, Agent, or Firm* — Carlson, Gaskey & Olds, P.C.

(57) ABSTRACT

A packaging assembly includes an outer packaging unit, at least one to-be-packaged unit, and a loading unit configured to accommodate the at least one to-be-packaged unit to limit movement of the at least one to-be-packaged unit with respect to the loading unit. The outer packaging unit includes a receiving unit capable of receiving at least a part of the loading unit and the at least one to-be-packaged unit which are fit to each other.

10 Claims, 9 Drawing Sheets

(51) Int. Cl.
*B65D 25/10* (2006.01)
*B65D 25/54* (2006.01)

(56) References Cited

U.S. PATENT DOCUMENTS

| | | | | |
|---|---|---|---|---|
| 6,247,598 | B1 | 6/2001 | Hosaka et al. | |
| 2001/0032799 | A1 | 10/2001 | Shinada | |
| 2002/0035818 | A1* | 3/2002 | Kropf | B65D 85/38 206/701 |
| 2004/0134801 | A1* | 7/2004 | Shimizu | B41J 2/17533 206/213.1 |
| 2008/0230439 | A1* | 9/2008 | Abrams | G06F 1/20 206/723 |
| 2013/0255826 | A1* | 10/2013 | Qing | B41J 2/17553 141/2 |
| 2014/0043405 | A1* | 2/2014 | Mizutani | B41J 2/17506 347/86 |
| 2014/0063151 | A1* | 3/2014 | Hooker | B41J 2/1752 347/86 |
| 2015/0367373 | A1* | 12/2015 | Dodd | B41J 2/14016 239/102.2 |
| 2018/0339827 | A1 | 11/2018 | Hyun | |

FOREIGN PATENT DOCUMENTS

| | | | |
|---|---|---|---|
| CN | 202428819 | | 9/2012 |
| CN | 103201188 | A | 7/2013 |
| CN | 204801248 | | 11/2015 |
| CN | 205708079 | A | 11/2016 |
| CN | 108341148 | | 7/2018 |
| CN | 209814597 | U | 12/2019 |
| CN | 209871036 | U | 12/2019 |
| CN | 110844245 | | 2/2020 |
| CN | 212862328 | U | 4/2021 |
| CN | 213355232 | U | 6/2021 |
| DE | 19501886 | A1 | 7/1996 |
| DE | 19810820 | | 6/1999 |
| EP | 1886823 | | 2/2008 |
| JP | H1156172 | | 3/1999 |
| JP | 2006175789 | | 7/2006 |
| JP | 2007157041 | | 6/2007 |
| JP | 3948274 | B2 | 7/2007 |
| JP | 2017161656 | | 9/2017 |
| WO | 2017/138825 | A1 | 8/2017 |

OTHER PUBLICATIONS

International Search Report for International Application No. PCT/CN2021/099987 dated Aug. 12, 2021.

Office action for JP Patent Application No. 2022-539733 dated Aug. 22, 2023.

Office action for JP Patent Application No. 2022-539733 dated Apr. 18, 2023.

Evaluation report for CN Patent Application No. 202021469672 dated May 17, 2022.

* cited by examiner

PACKAGING ASSEMBLY

The present application is a national stage of International Application No. PCT/CN2021/099987, filed on Jun. 15, 2021, which claims priority to Chinese Patent Application No. 202021469672.4, filed on Jul. 23, 2020, entitled "PACKAGING ASSEMBLY". Both of the aforementioned applications are hereby incorporated by reference in their entireties.

TECHNICAL FIELD

The present disclosure relates to the technical field of printer, and in particular, to a packaging assembly.

BACKGROUND

FIG. 1 is a schematic diagram of a consumable and a resetter in the related art. As shown in FIG. 1, in the related art, the consumables sometimes need to be repaired. In particular, after the printing raw materials (e.g., ink, toner) are rejected into the recycled consumable 10, the restoring of the printing raw material information and the correction of the consumable model information should be performed on the chip 110. During such correction, the consumable 10 need to be disposed on the resetter 20 in such a manner that the terminals 111 of the chip 110 on the consumable 10 are in contact with the contacts 210 on the resetter 20, and the resetter 20 is activated to restore or correct the chip 110 by the program on the resetter 20.

During the manufacturing process of the related art, the reset process of the semi-finished product of the consumable 10 includes installing the semi-finished product of the consumable 10 on the resetter 20, completing the reset, and then removing it from the resetter 20. The above operation will be performed on each of the consumables 10, and then the reset operation is finished. If the chip detection process is required after this process operation, a detection process is also required. The detection process includes installing the chip on the detector, completing the detection, and then removing the chip from the detector. This process is cumbersome and inefficient.

SUMMARY

The present disclosure provides a packaging assembly including an outer packaging unit and at least one to-be-packaged unit. The packaging assembly also includes a loading unit configured to accommodate the at least one to-be-packaged unit to limit movement of the at least one to-be-packaged unit with respect to the loading unit. The outer packaging unit includes a receiving unit capable of receiving at least a part of the loading unit and the to-be-packaged unit which are fit to each other.

In some embodiments, the at least one to-be-packaged unit includes two or more to-be-packaged units that are detachably connected to the loading unit, and the loading unit is configure to limit the movement of the two or more to-be-packaged units with respect to the loading unit.

In some embodiments, the loading unit includes a partition, and when the two or more to-be-packaged units are accommodated in the loading unit, the partition is configured to separate every two adjacent to-be-packaged units of the two or more to-be-packaged units.

In some embodiments, the loading unit also includes an installing unit, and the installing unit is capable of being fixedly connected to the two or more to-be-packaged units and is configured to limit movement of the two or more to-be-packaged units.

In some embodiments, the installing unit is an installing groove provided in the loading unit, one of the installing groove and one to-be-packaged unit of the two or more to-be-packaged units is provided with a protrusion, and another one of the installing groove and the one to-be-packaged unit is provided with a groove, and the protrusion and the groove are snap-fit together to limit the movement of the two or more to-be-packaged units with respect to the loading unit when the two or more to-be-packaged units are fit to the loading unit.

In some embodiments, one of the at least one to-be-packaged unit includes a chip, and the loading unit is provided with a window configured to expose at least a part of the chip.

In some embodiments, the outer packaging unit also includes an operation window, one of the at least one to-be-packaged unit includes a chip, the operation window is configured to expose at least a part of the chip, and the chip and/or one of the at least one to-be-packaged unit is capable of being operated through the operation window from an exterior of the outer packaging unit.

In some embodiments, the packaging assembly includes a protection unit covering at least a part of the operation window and configured to prevent the receiving unit from communicating with the exterior.

In some embodiments, the protection unit includes an upper cover and a lower cover which are fit to each other, the lower cover is fixedly connected to the outer packaging unit, and the upper cover is capable of moving with respect to the lower cover in such a manner that the upper cover is capable of moving to cover or to open the operation window.

In some embodiments, the outer packaging unit includes a first outer packaging member and a second outer packaging member. The first outer packaging member and the second outer packaging member are detachably connected to each other to form the receiving unit. The first outer packaging member comprises a first operation window, and the second outer packaging member comprises a second operation window. When the first outer packaging member is fit to the second outer packaging member, the first operation window and the second operation window are at least partially overlapped with each other.

In some embodiments, the packaging assembly includes a buffer member which is provided between the outer packaging unit and the to-be-packaged unit.

It should be understood that the foregoing general description and the following detailed description are merely exemplary and do not limit the present disclosure.

BRIEF DESCRIPTION OF DRAWINGS

In order to illustrate the technical solutions of the embodiments according to the present disclosure more clearly, the accompanying drawings required in the embodiments will be briefly introduced below. The drawings in the following description are merely some embodiments of the present utility model. For those skilled in the art, other drawings can also be achieved from these drawings.

DESCRIPTION OF EMBODIMENTS

Figure 1:
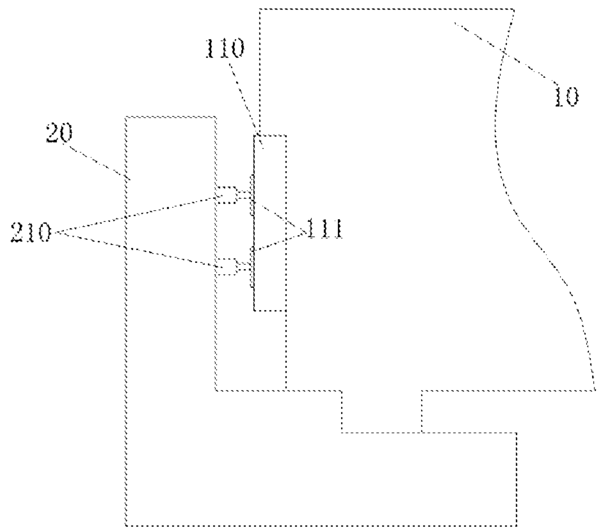
FIG. 1 is a schematic diagram of a consumable and a resetter in the prior art.

In order to better understand the technical solutions of the present disclosure, the embodiments of the present disclosure are described in detail below with reference to the accompanying drawings.

It should be clear that the described embodiments are only some of the embodiments of the present disclosure, rather than all of the embodiments. Based on the embodiments in the present disclosure, all other embodiments obtained by those skilled in the art shall fall within the protection scope of the present disclosure.

The terms used in the embodiments of the present disclosure are only for the purpose of describing the embodiments, and are not intended to limit the present disclosure. As used in the embodiments of this application and the appended claims, the singular forms "a," "said," and "the" are intended to include the plural forms as well, unless the context clearly dictates other meanings.

It should be understood that the term "and/or" used herein is only an association relationship to describe the associated objects, indicating that there can be three kinds of relationships, for example, A and/or B, which can indicate three cases: A alone, A and B, and B alone. The character "/" herein generally indicates that the related objects are in an "or" relationship.

It should be noted that the directional words such as "up", "down", "left", and "right" described in the embodiments of the present disclosure are described from the views shown in the drawings, and should not be construed to limit the present disclosure. In addition, in the context, it should also be understood that when an element is referred to as being "on" or "under" another element, it can not only be directly connected "on" or "under" the other element, but also indirectly connected "on" or "under" another element through an intervening element The present disclosure provides a packaging assembly, which includes an outer packaging unit and a to-be-packaged unit. The outer packaging unit has a receiving unit, and is configured to package a to-be-packaged unit. The to-be-packaged unit is provided with a data storage unit (e.g., a chip) thereon, and the to-be-packaged unit can be a consumable (toner cartridge, an ink box, ribbon, or the like) used in an imaging device, or a set-top box and the like used in electronic products, as well as other types of box structures. The data storage unit (e.g., the chip) provided on the to-be-packaged unit is a storage device configured to store a liquid/toner capacity in the to-be-packaged unit or other related data. The data storage unit can be different storage devices. Therefore, the above to-be-packaged unit and the data storage unit provided on the to-be-packaged unit can have multiple different structures, and the structural fitting of the corresponding outer packaging unit is accordingly adjusted based on a corresponding size, a corresponding position, and a corresponding shape of different to-be-packaged units and data storage units, etc., such that the to-be-packaged unit and the corresponding outer packaging unit can be fit to each other, which is not limited herein. In order to describe the packaging assembly, the following embodiments are exemplarily illustrated by taking the to-be-packaged unit being a consumable (the toner cartridge, the ink box, the ribbon, or the like) and the data storage unit being a chip.

In some embodiments of the present disclosure, the basic structure of the imaging device (such as a laser printer, or an inkjet printer) has conventional design in the art. Except explanatory structure, the structures of the consumable (the toner cartridge, the ink box, the ribbon, or the like) have conventional designs in the art.

Embodiment 1

Figure 2:
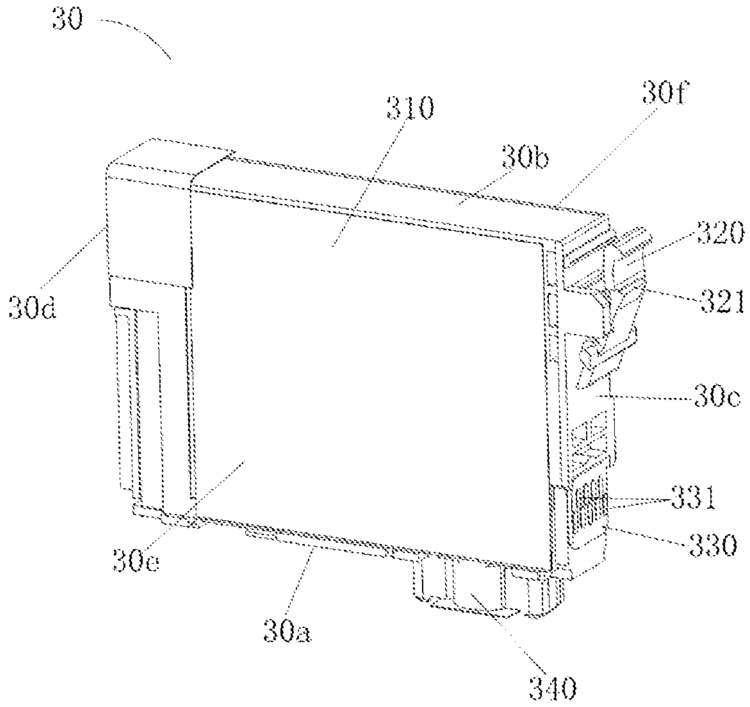
FIG. 2 is a schematic diagram of a consumable according to Embodiment 1.

FIG. 2 is a schematic diagram of a consumable according to Embodiment 1. A consumable 30 is generally in a cuboid shape with six surfaces, i.e., a bottom surface 30*a*, a top surface 30*b*, a first side surface 30*c*, a second side surface 30*d*, a third side surface 30*e*, and a fourth side surface 30*f* After the consumable 30 is installed on a printer by a user, the consumable 30 can supply a printing raw material for a printing operation of the printer. The consumable 30 includes a main body 310, a fixing member 320, a data storage unit (taking a chip 330 as an example for illustration in this embodiment), and a supply port 340.

The consumable 30 can be the ink box, the toner cartridge, or the ribbon. The printing raw material can be ink, toner, etc. The main body 310 stores the printing raw material, and provides the printing raw material to the printer through the supply port 340 whenever the printing raw material is needed. The fixing member 320 is configured to fix the consumable 30 to the printer. The fixing member 320 includes a clamping member 321. The clamping member 321 can be fit to a component provided on the printer, to fix the consumable 30 to the printer. As the consumable 30 is installed on the printer, an electrical signal is transmitted between the chip 330 and the printer. The chip 330 stores category information of the printing raw material, storage amount information of the printing raw material in the consumables 30, model information of the consumable, and the like. The chip 330 is provided with a terminal 331. For example, terminals 331 of the chip 330 are in contact with the printer, such that electrical signals can be transmitted.

As shown in FIG. 2, the supply port 340 is provided on the bottom surface 30*a* of the consumable 30, and the chip 330 and the fixing member 320 are provided on the first side surface 30*c* of the consumable 30. In an embodiment, the fixing member 320 is a handle that can rotate around a fulcrum, and the fixing member 320 can be a fastening member that can move in parallel or an elastic member with elasticity.

Figure 3:
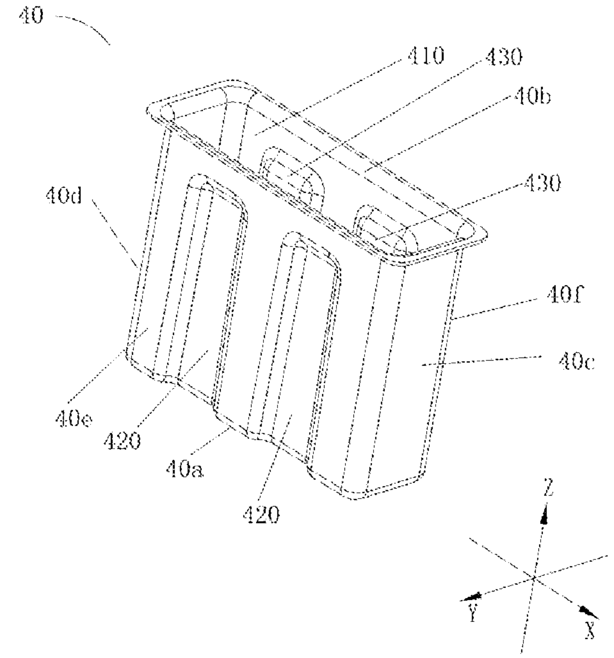
FIG. 3 is a schematic diagram of a loading unit according to Embodiment 1.

FIG. 3 is a schematic diagram of the loading unit according to Embodiment 1. The loading unit 40 can accommodate the consumable 30 to limit movement of the consumable 30 with respect to the loading unit 40. The receiving unit of the outer packaging unit can accommodate at least a part of the loading unit 40 and the consumable 30 which are fit to each other. The consumable 30 can be fixedly installed on the loading unit 40. The loading unit 40 is generally in a cuboid shape with an opening. The loading unit 40 has an opening 40*b*, a bottom surface 40*a*, a first side surface 40*c*, a second side surface 40*d*, a third side surface 40*e*, and a fourth side surface 40*f*. A three-dimensional cartesian coordinate system is established, and three coordinate axes that are perpendicular to each other are X-axis, Y-axis, and Z-axis, respectively. A direction pointing from the bottom surface 40*a* to the opening 40*b* is a +Z axis direction, a direction pointing from the second side surface 40*d* to the first side surface 40*c* is a +X axis direction, and a direction pointing from the fourth side surface 40*f* to the third side surface 40*e* is a +Y axis direction. The loading unit 40 includes an installing unit 410, and the installing unit 410 can be fixedly connected to the consumable 30 to limit the movement of the consumable 30. For example, the installing unit 410 is an installing groove provided in the loading unit 40, a recess is provided on an inner wall of the installing groove and is recessed towards the installing groove, and at least a part of the recess abuts against the consumable 30 to limit the movement of the consumable 30 with respect to the loading unit 40. It can be understood that the loading unit 40 includes the installing unit 410, a first recess 420, and a second recess 430. The opening 40*b* is provided in the +Z-axis direction of the loading unit 40. The loading unit 40 can be provided with a recess on one or more surfaces of the bottom surface 40*a*, the first side surface 40*c*, the second side surface 40*d*, the third side surface 40*e*, and the fourth side surface 40*f*. An inner surface of the recess can be configured to clamp and fix the consumable 30, while the recesses on the first side surface 40*c*, the second side surface 40*d*, the third side surface 40*e*, and the fourth side surface 40*f* can also be provided with guiding parts, and the guiding parts gradually extends into the installing unit 410 along a −Z axis direction, such that the consumable 30 can be guided during the process of installing the consumables 30 on the loading unit 40, so as to avoid the condition that the consumable 30 cannot be fixed or cannot be fit to the outer packaging unit during the manufacturing process due to the fact that the consumable 30 is installed obliquely. As shown in FIG. 3, in the embodiment, the first recess 420 is provided on the third side surface 40*e*, and the second recess 430 is provided on the fourth side surface 40*f* The guiding units are provided on a +Z axis side of the first recess 420 and a +Z axis side of the second recess 430, and the guiding units gradually extends into the installing unit 410 along the −Z axis direction.

Figure 4:
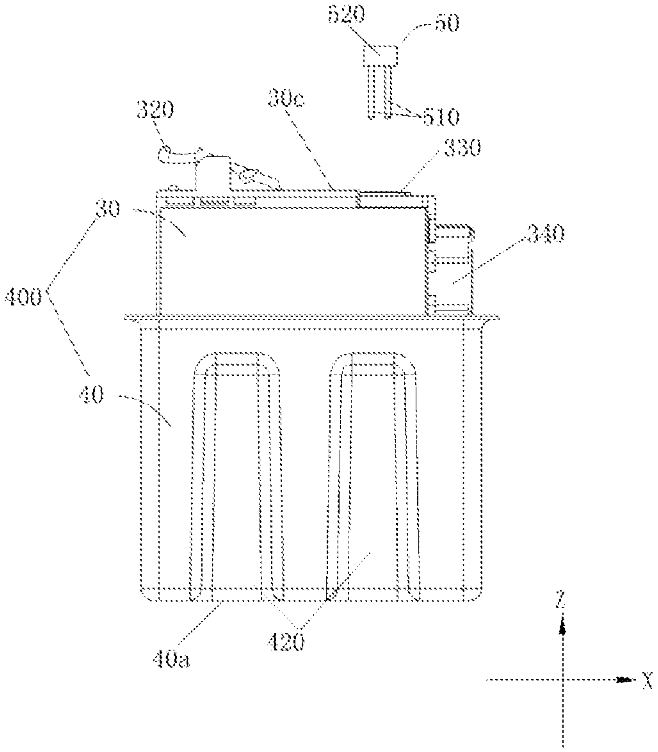
FIG. 4 is a schematic diagram illustrating a case in which the consumable is being assembled to the loading unit according to Embodiment 1.

FIG. 4 is a schematic diagram illustrating a case in which the consumable is being assembled to the loading unit according to Embodiment 1. The process of installing the consumables 30 to the loading unit 40 includes step A, step B, and step C. At step A, the loading unit 40 is placed with the bottom surface 40*a* positioned at a lower part of a plumb line direction and the opening 40*b* positioned at an upper part of the plumb line direction, that is, the loading unit 40 is placed in a posture with the −Z axis direction as the plumb line direction. At step B, the consumable 30 is placed in the installing unit 410 of the loading unit 40 along the −Z axis direction in a posture in which the second side surface 30*d* is positioned at the −Z axis side. At step C, the consumable 30 is fixedly installed on the loading unit 40 to form a combined body 400.

After the consumable 30 is installed on the loading unit 40, at least a part of the consumable 30 is exposed, and the exposed part of the consumable 30 includes the chip 330. As shown in FIG. 4, the chip 330, the fixing member 320, and the supply port 340 of the consumable 30 are all exposed.

An operator 50 includes a contact pin 510 and a control unit 520. The control unit 520 has an operation program capable of repairing or correcting the chip 330 through the contact pin 510. The combined body 400, as a whole, is stored, transferred and transported in the subsequent manufacturing process. Operation steps for restoring the printing raw material information of the chip 330 of the semi-finished product or the finished product of the consumable 30 or correcting the consumption model information of this chip 330 by using the operator 50 (e.g., the chip 330 is repaired or corrected after the printing raw material is re-injected to the recycled consumable 30,) include step A where the combined body 400 is placed in a posture with the −Z axis direction as the plumb line direction, step B where the operator 50 gradually approaches the combined body 400 along the −Z axis direction until the contact pin 510 abuts against the terminal 331 on the chip 330, step C where a start button of the operator 50 is pressed or the operator 50 is automatically activated such that the operator 50 starts to perform a restoring procedure or a correcting procedure, and step D where the operation is completed and the operator 50 is far away from the combined body 400.

The operator 50 can also have a detection procedure, and after the chip 330 is repaired or corrected, the detection procedure is performed, thereby reducing manufacturing steps and improving manufacturing efficiency.

In the structure of this embodiment, the consumable 30 is fixedly installed on the loading unit 40. During the manufacturing process, the loading unit 40 is configured to load and transport the semi-finished product or the finished product of the consumable 30. That is, the loading unit 40 and the consumable 30 are stored, transferred, and transported together. In this way, the manufacturing efficiency is improved, placing the consumables 30 in a designated manner is facilitated, the convenience of the manufacturing process is improved, automatic manufacturing is facilitated, and at the same time, is it prevented that the chip is contaminated during the manufacturing process. The process of disassembling and assembling the consumable 30 from the resetter or the detector is optimized, and thus the manufacturing efficiency is improved.

If not using the loading unit 40, during the manufacturing process of the consumable 30, it is difficult to place the consumable 30 in the designated manner, and the consumable 30 will be placed unstably and fail to be stably placed in the designated manner. The consumable 30 is directly placed on an assembly line for manufacturing and transporting, and the chip 330 can be contaminated by a foreign matter, dust, etc. on the assembly line during this process.

The operator 50 can realize one fixation as well as the reset process and the detection process.

Figure 5:
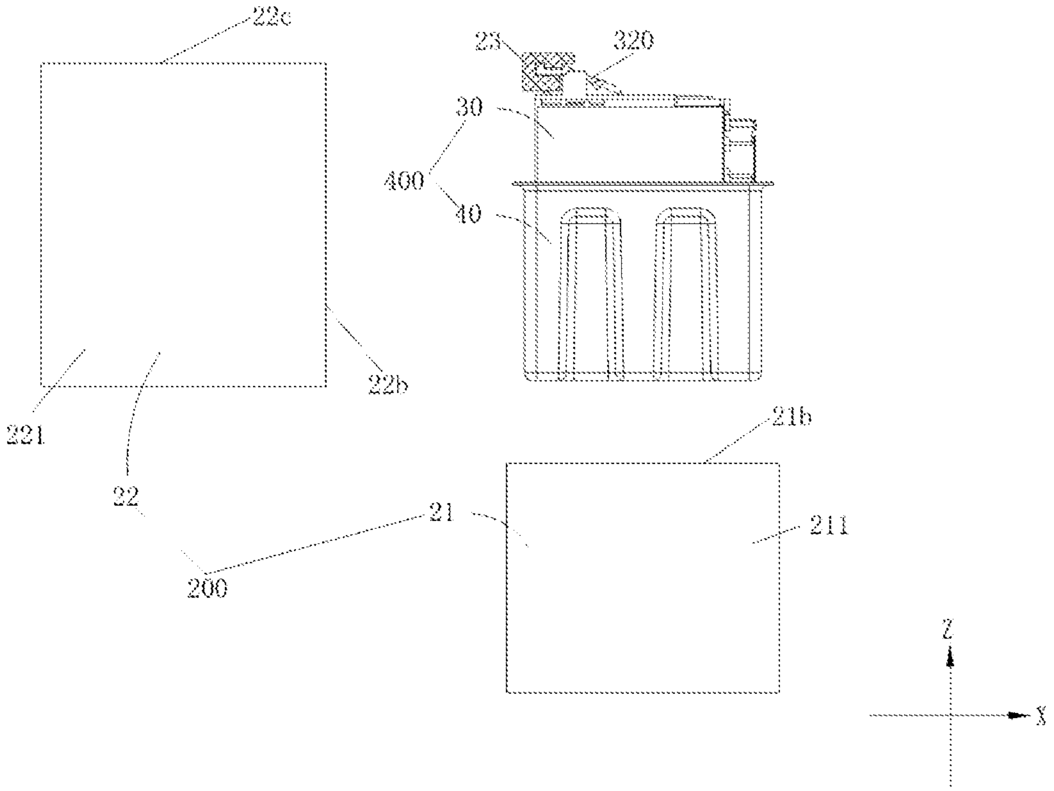
FIG. 5 is a schematic diagram of a packaging assembly according to Embodiment 1.

FIG. 5 is a schematic diagram of the packaging assembly according to Embodiment 1. The packaging assembly includes a combined body 400, an outer packaging unit 200, and a buffer member 23. The buffer member 23 is arranged between the outer packaging unit 200 and the consumable 30 and is configured to prevent the consumable 30 from contacting the outer packaging unit 200 or configured to prevent the fixing member 320 from being damaged.

The combined body 400 includes the consumable 30 and the loading unit 40 that accommodates the consumable 30. The consumable 30 is fixedly installed on the loading unit 40 to form the combined body 400. The outer packaging unit 200 includes a receiving unit which is at least capable of accommodating at least a part of the combined body 400. As shown in FIG. 5, in the embodiment, the outer packaging unit 200 includes a first outer packaging member 21 and a second outer packaging member 22. The first outer packaging member 21 and the second outer package 22 are detachably connected to form the receiving unit. For example, the first outer packaging member 21 and the second outer packaging member 22 each are substantially in a cuboid shape with an opening. The first outer packaging member 21 and the second outer packaging member 22 are parts of the outer packaging unit 200. The first outer packaging member 21 and the second outer packaging member 22 each can be made of plastic, cardboard, and the like. The first outer packaging member 21 includes a first receiving unit 211 and an opening 21*b*. The second outer package 22 includes a second receiving unit 221 and an opening 22*b*. In the packaging process, at first, the combined body 400 is loaded into the first receiving unit 211 of the first outer packaging member 21 along the −Z axis direction; then, the combined body 400 and the first outer package 21 are loaded into the second receiving unit 221 of the second outer packaging member 22 along the −X axis direction; and finally, at least two surfaces of the outside of the combined body 400 and the outer packaging unit 200 are covered with sealing films, and the packaging is completed.

A material of the loading unit 40 includes, but is not limited to, metal, plastic, cardboard, rubber, or other materials to form the loading unit 40 that can accommodate the consumable 30. The loading unit 40 can be made adoptively by different processes such as injection molding, blow molding, and stamping according to different requirements such as the selected material and the strength of the loading unit to be processed. If the material of the loading unit 40 is rubber, an interference fit is formed between the loading unit 40 and the consumable 30 and has a buffer function during the transportation process and the storage process when the combining body 400 is placed in the outer packaging unit 200.

The buffer member 23 is placed around a vulnerable part of the consumable 30 to avoid damage to the vulnerable part. As shown in FIG. 5, the vulnerable part of the consumable 30 in this embodiment is the fixing member 320 and is easily damaged by external impact and other reasons due to that it is a movable member. The buffer member 23 is placed around the fixing member 320 to avoid damage to the fixing member 320.

Magnetic suction devices can be arranged at corresponding positions on the first outer packaging member 21 and the second outer packaging member 22 in advance. In the final step of packaging, the sealing film is not used, and the magnetic suction devices that are located on the first outer packaging member 21 and the second outer packaging member 22 can be matched with each other. The first outer packaging member 21 and the second outer packaging member 22 can also be fixed by means of sticking or sealing film.

Figure 6:
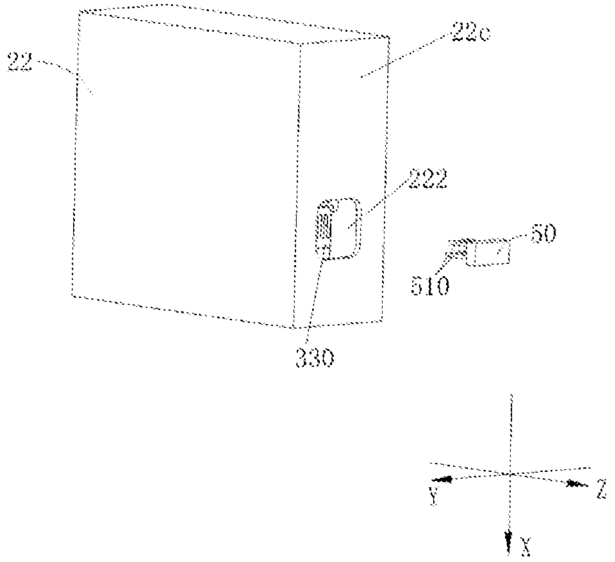
FIG. 6 is a schematic diagram of the packaging assembly and an operator according to Embodiment 1.

As shown in FIG. 5 and FIG. 6, FIG. 6 is a schematic diagram of the packaging assembly and the operator according to Embodiment 1. A second operation window 222 is provided on the first side surface 22*c* of the second packaging member 22, and the chip 330 and/or the consumable 30 located in the loading part 40 can be operated through the second operation window 222 from an exterior of the outer packaging unit. For example, the second operation window 222 is a through hole provided on the first side surface 22*c* and extending along the Z-axis direction. The second operation window 222 is configured to expose at least a part of the chip 330. The second operation window 222 exposes the terminal 331 of the chip 330. For example, the second operation window 222 exposes the entire chip 330. With such structure, operations, such as upgrading, resetting, correcting, replacing, can be performed in the chip 330 without unpackaging the packaging assembly.

As a part of the packaging assembly for the consumable, the loading unit 40 is loaded into the outer packaging unit 200 together with the consumable 30, so as to optimize the process of disassembling the consumable from the resetter or the detector, thereby improving the manufacturing efficiency.

With the second operation window 222 on the outer packaging unit 200, operations such as upgrading, resetting, correcting, and replacing can be performed on the chip 330 without unpackaging the packaging assembly for the consumable.

For example, operation steps of operating the chip 330 from the exterior of the packaging assembly for the consumable include step A where the packaging assembly for the consumable is placed in a stable posture, step B where the operator 50 gradually approaches the packaging assembly along the −Z axis direction until the contact pin 510 abuts against the terminal 331 of the chip 330, step C where the start button of the operator 50 is pressed or the operator 50 is automatically activated and then the operator 50 starts to perform the corresponding procedure, and step D where the operation is completed and the operator 50 is far away from the combined body 400.

With such structure, the model and ink type of the consumable 30 can be detected by the chip 330 without unpackaging assembly.

Embodiment 2

Figure 7:
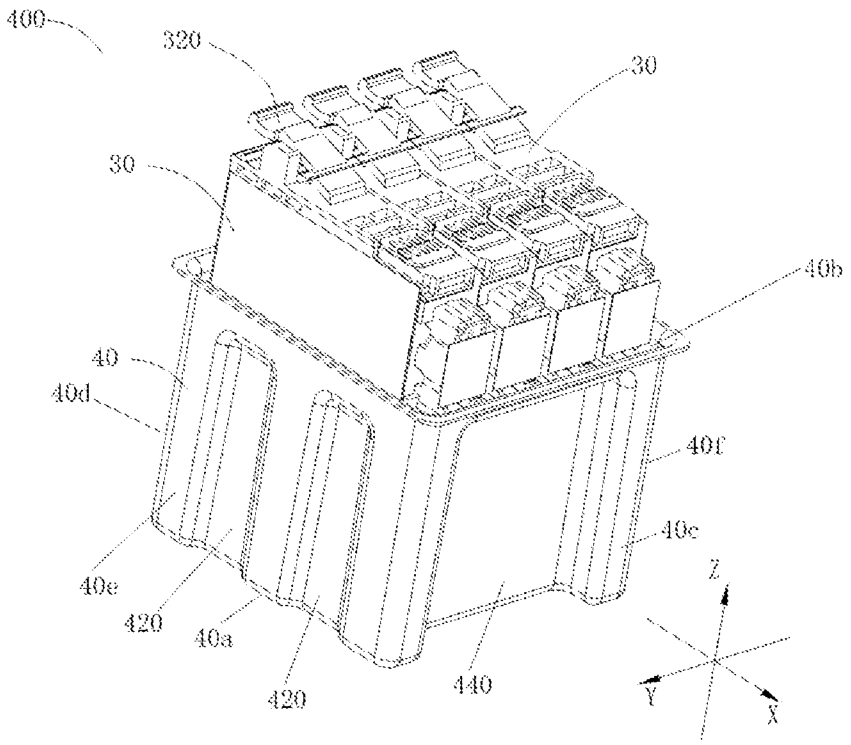
FIG. 7 is a schematic diagram of a combined body according to Embodiment 2.
Figure 8:
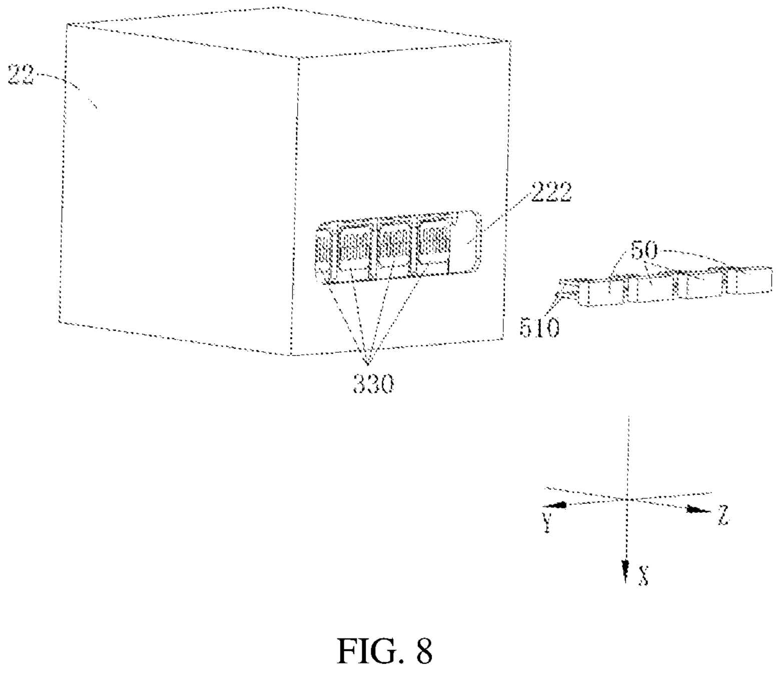
FIG. 8 is a schematic diagram of a packaging assembly and an operator according to Embodiment 2.

FIG. 7 is a schematic diagram of a combined body according to Embodiment 2. FIG. 8 is a schematic diagram of a packaging assembly and an operator according to Embodiment 2.

The combined body 400 includes multiple consumables 30 (two or more consumables 30) and a loading unit 40. The multiple consumables 30 are detachably connected to the loading unit 40, and the loading unit 40 is configured to limit the movement of the consumables 30 with respect to the loading unit 40. The multiple consumables 30 can be installed in the installing unit 410 along the −Z axis direction. The multiple consumables 30 form a whole set of consumables. For example, the multiple consumables 30 are four different consumables with four different colors (black, red, yellow, and blue). For another example, the multiple consumables 30 are four black consumables, facilitating users to purchase uniformly. In this embodiment, the multiple consumables 30 are consumables with four different colors. The combined body 400 includes four consumable 30 and a loading unit 40. In the manufacturing process, the whole set of consumables 30 are fixedly installed in the loading unit 40, and the whole set of consumables are restored, corrected and detected simultaneously when performing restoring, correcting, or detecting, which saves time and improves efficiency.

In addition to the installing unit 410, the first recess 420, and the second recess 430, the loading unit 40 also includes a third recess 440 and a fourth recess (not shown in the figures). The third recess 440 is provided on the first side surface 40*c*, and an inner surface of third recess 440 can fix the consumable 30. The fourth recess is opposite to the third recess 440 and provided on the second side surface 40*d*, and an inner surface of the fourth recess can fix the consumable 30.

The second outer packaging member 22 of the outer packaging unit 200 is provided with the second operation window 222, and the second operation window 222 can expose at least a part of all the chips 330 of the consumables 30. For example, the second operation window 222 exposes the terminals 331 of all chips 330. For example, all the chips 330, as a whole, are exposed by the second operation window 222. With such structure, operations such as upgrading, resetting, correcting, and replacing can be performed on the chip 330 without unpackaging the packaging assembly.

The other parts of this embodiment are consistent with Embodiment 1.

Embodiment 3

Figure 9:
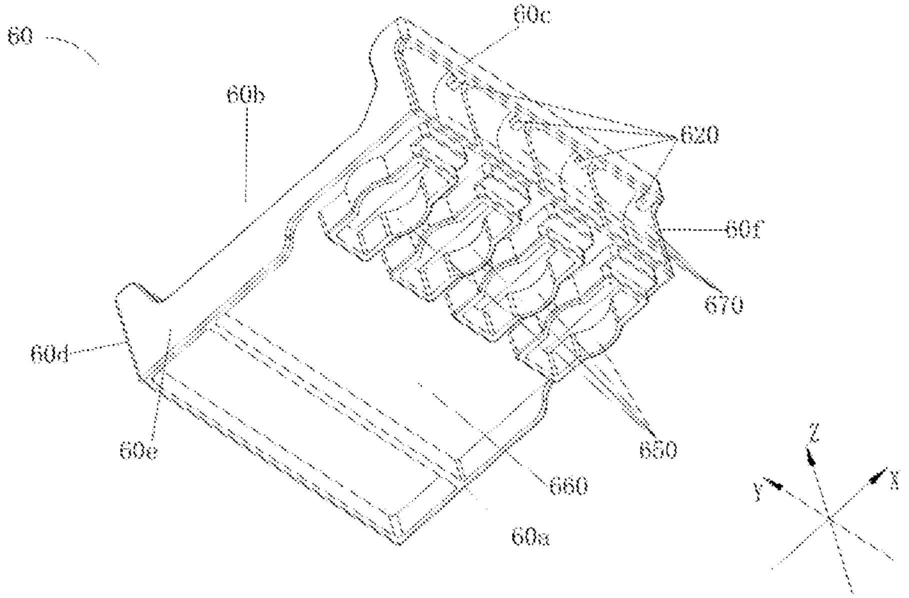
FIGS. 9 and 10 are schematic diagrams of a loading unit according to Embodiment 3.
Figure 10:
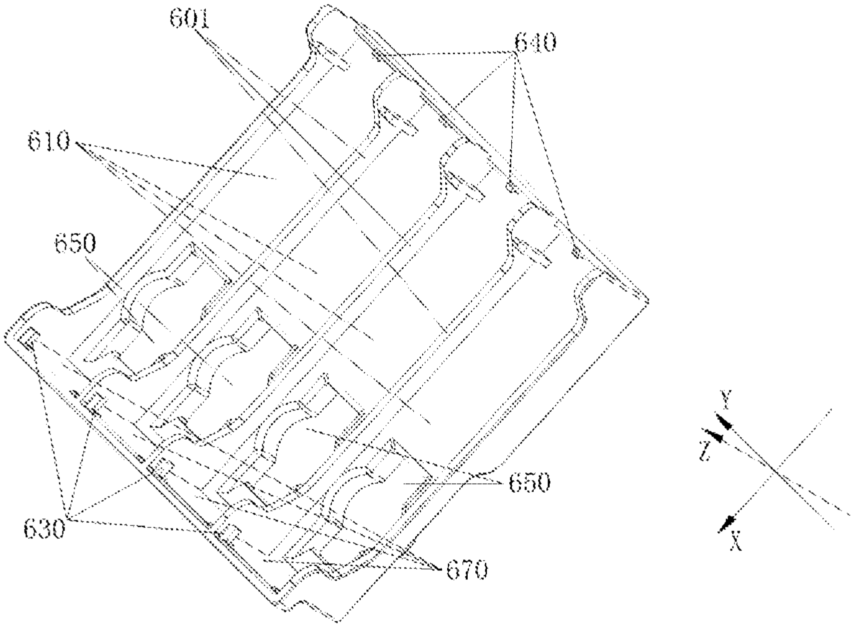

FIGS. 9 and 10 are schematic diagrams of a loading unit according to Embodiment 3.

A loading unit 60 can accommodate multiple consumables 30 which can be fixedly installed on the loading unit 60. The installing unit is an installing groove on the loading unit 60. One of the installing groove and the consumable 30 is provided with a protrusion, and the other one of the installing groove and the consumable 30 is provided with a groove. The protrusion and the groove are snap-fit to limit the movement of the consumable 30 with respect to the loading unit 60. For example, the loading unit 60 is generally in a U-shaped cuboid shape with an opening and with grooves located on two side surfaces. The loading unit 60 has an opening 60*b*, a bottom surface 60*a*, a first side surface 60*c*, a second side surface 60*d*, a third side surface 60*e*, and a fourth side surface 60*f*. The loading unit 60 includes multiple installing units 610, a partition 601, a first protrusion 620, a second protrusion 630, a fourth protrusion 640, a fifth protrusion 660, a notch 650, and a window 670. The opening 60*b* is provided in the +Z axis direction of the loading unit 60. As shown in FIGS. 9 and 10, in this embodiment, each installing unit 610 has the first protrusion 620, the second protrusion 630, the fourth protrusion 640, the fifth protrusion 660, the notch 650 and the window 670. The first protrusions 620, the second protrusions 630, the fourth protrusions 640, and the fifth protrusions 660 are fixing members for fixing the consumables 30 to the loading unit 60. The first protrusion 620, the second protrusion 630, the fourth protrusion 640, and the fifth protrusion 660 are protrusions extending from an inner side wall of each installing unit 610 towards a direction of going into the installing unit 610. The consumable 30 is provided with a groove that fits with the protrusion, so as to realize the fixed connection between the groove and the protrusion by snap-fitting. For example, a guiding part can be provided on each of the first protrusion 620, the second protrusion 630, the fourth protrusion 640, and the fifth protrusion 660, and the guiding part gradually extends into the installing unit 610 along the −Z axis direction.

The notch 650 is a through hole provided on the bottom surface 60*a* for accommodating the supply port 340 of the consumable 30. The window 670 is a through hole provided on the first side surface 60*c*. When the consumable 30 is installed on the loading unit 60, the window 670 exposes at least a part of the chip 330.

The partition 601 of the loading unit 60 are used to separate every two adjacent consumables 30. The partition 601 are arranged between multiple consumables 30, which avoids the situation that the consumables 30 are unstably arranged in the loading unit 60 due to that the multiple consumables 30 abut against each other.

In the structure of this embodiment, the multiple consumables 60 are fixedly installed on the loading unit 60. During the manufacturing process, the loading unit 60 is configured to load and transport the semi-finished products or the finished products of the consumables 30. That is, the loading unit 60 and the consumables 30 are stored, transferred and transported together, such that the manufacturing efficiency is improved, placing the consumables 30 in a designated manner is facilitated, the convenience of the manufacturing process is improved, automatic manufacturing is facilitated, and at the same time, it is prevented that the chip is contaminated during the manufacturing process. The process of disassembling and assembling the consumable 30 from the resetter or the detector is optimized, thereby improving the manufacturing efficiency.

Figure 11:
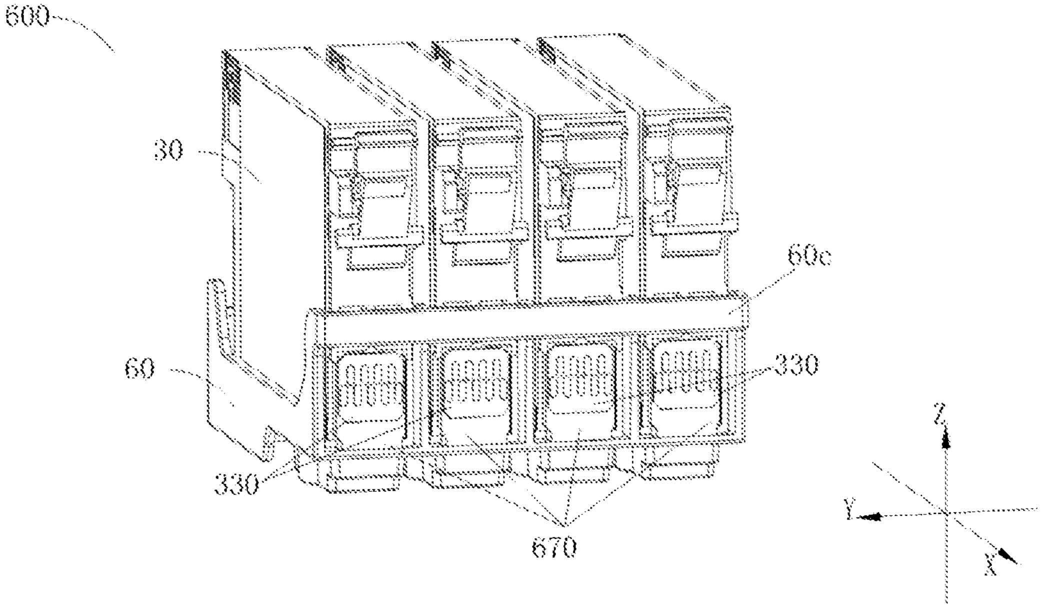
FIG. 11 is a schematic diagram illustrating a case in which the consumable is being assembled to the loading unit according to Embodiment 3.

As shown in FIG. 11, in this embodiment, the consumables 30 are four consumables with four different colors. The combined body 600 includes four consumables 30 and a loading unit 60. In the manufacturing process, the whole set of consumables 30 are installed and fixed on the loading unit 60, and the whole set of consumables are restored, corrected and detected simultaneously when performing restoring, correcting or detecting, which saves time and improves efficiency.

FIG. 11 is a schematic diagram illustrating a case in which the consumable is being assembled to the loading unit according to Embodiment 3. The process of installing the consumables 30 to the loading unit 60 includes step A where the loading unit 60 is placed with the bottom surface 60*a* located at the lower part of the plumb line direction and the opening 60*b* located at the upper part of the plumb line direction, that is, the loading unit 60 is placed in a posture in which the −Z axis direction is the plumb line direction; step B where multiple consumables 30 are sequentially placed in the installing units 610 of the loading unit 60 along the −Z axis direction in a posture in which the bottom surface 30*a* is positioned at the −Z axis side; and step C where the consumable 30 is fixedly installed on the loading unit 60 to form a combined body 600.

Figure 12:
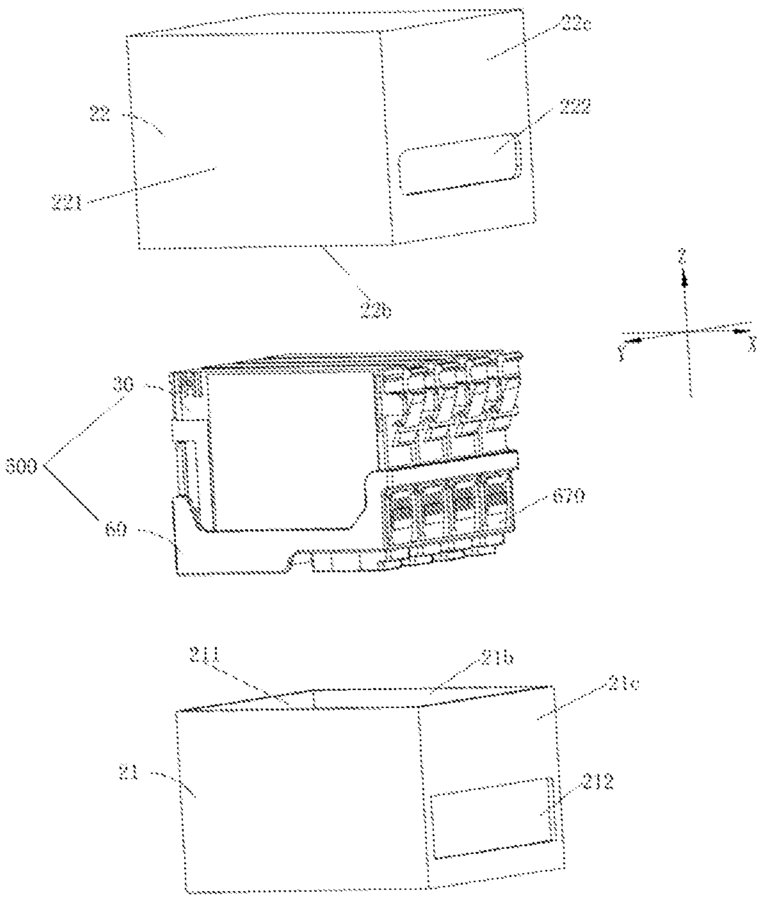
FIG. 12 is a schematic diagram of the packaging assembly according to Embodiment 3.
Figure 13:
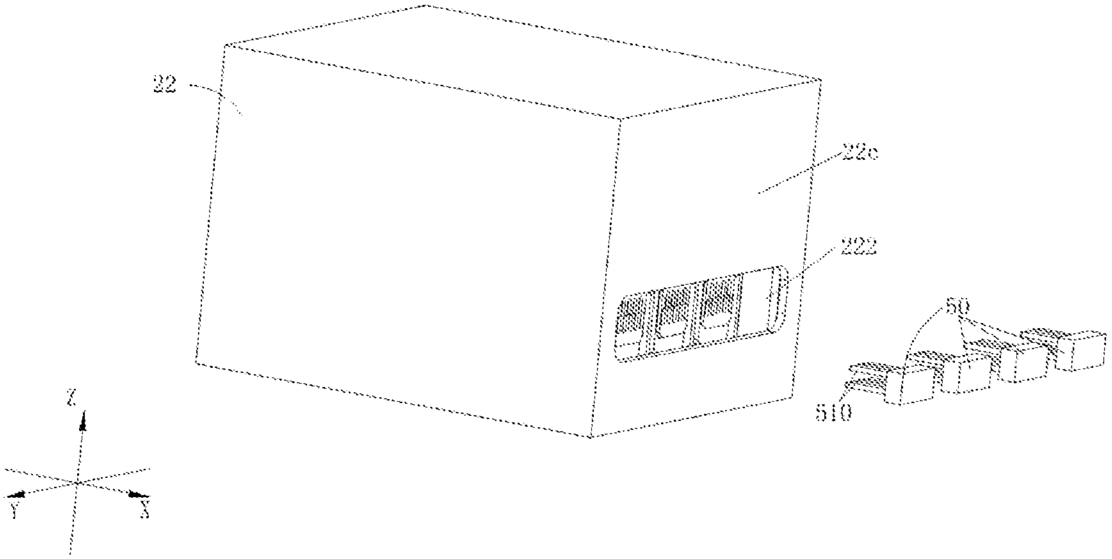
FIG. 13 is a schematic diagram of the packaging assembly and an operator according to Embodiment 3.

FIG. 12 is a schematic diagram of the packaging assembly according to Embodiment 3. FIG. 13 is a schematic diagram of the packaging assembly and an operator according to Embodiment 3. The packaging assembly for the consumable includes a combined body 600 and an outer packaging unit 200.

The combined body 600 includes multiple consumables 30 and a loading unit 60 for accommodating the multiple consumables 30. The consumables 30 are fixedly installed on the loading unit 60 to form the combined body 600. The outer packaging unit 200 includes a receiving unit, and the receiving unit can at least accommodate at least a part of the combined body 600. As shown in FIG. 5, in this embodiment, the outer packaging unit 200 includes a first outer packaging member 21 and a second outer packaging member 22. Both the first outer packaging member 21 and the second outer packaging member 22 are substantially in a cuboid shape with an opening. The first outer packaging member 21 and the second outer packaging member 22 each are a part of the outer packaging. The material of the first outer packaging member 21 and the second outer packaging member 22 can be plastic, cardboard, etc. The first outer packaging member 21 includes a first receiving unit 211, an opening 21*b*, and a first operation window 212. The second outer packaging member 22 includes a second receiving unit 221, an opening 22*b*, and a second operation window 222. In the packaging process, at first, the combined body 600 is loaded into the first receiving unit 211 of the first outer packaging member 21 along the −Z axis direction; then, the combined body 600 and the first outer packaging member 21 are loaded into the second receiving unit 211 of the outer packaging member 22 along the +Z axis direction; and finally, at least two surfaces of the outside of the combined body 600 and the outer packaging unit 200 are covered with sealing film, and the packaging is completed.

After packaging the packaging assembly for the consumable, the first operation window 212 and the second operation window 222 are at least partially overlapped with each other. The first operation window 212 and the second operation window 222 correspond to the positions of the windows 670. The first operation window 212, the second operation window 222, and the window 670 expose at least a part of the chip 330. With such structure, operations such as upgrading, resetting, correcting, and replacing can be performed on the chip 330 without unpackaging the packaging assembly.

The other parts of the embodiment are consistent with Embodiment 2.

Embodiment 4

Figure 14:
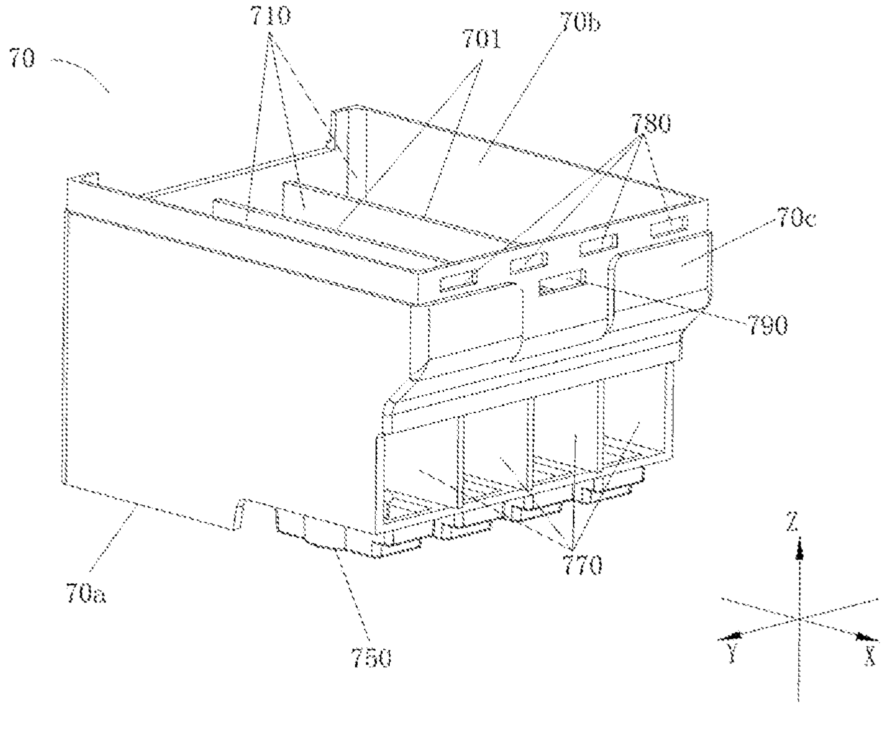
FIG. 14 is a schematic diagram of a loading unit according to Embodiment 4.
Figure 15:
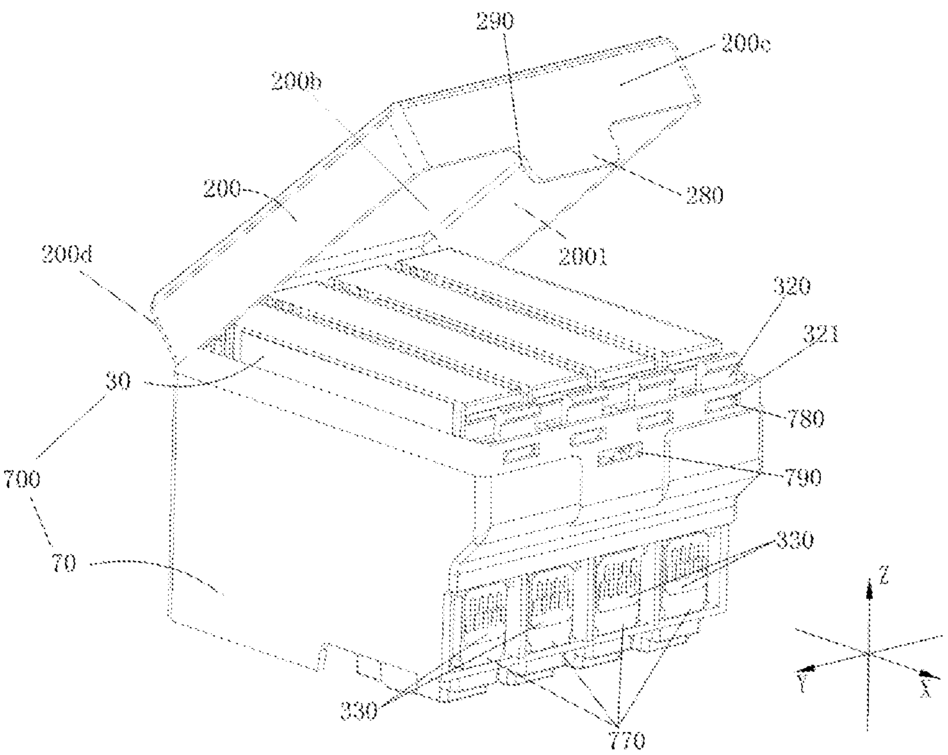
FIG. 15 is a schematic diagram of a packaging assembly according to Embodiment 4.

FIG. 14 is a schematic diagram of a loading unit according to Embodiment 4. FIG. 15 is a schematic diagram of a packaging assembly according to Embodiment 4.

The loading unit 70 is generally in a cuboid shape with an opening. The loading unit 70 has an opening 70*b*, a bottom surface 70*a*, a first side surface 70*c*, a second side surface 70*d*, a third side surface 70*e*, and a fourth side surface 70*f* The loading unit 70 includes multiple installing units 710, a partition 701, a notch 750, a window 770, a first groove 780, and a second groove 790. The opening 70*b* is provided in the +Z axis direction of the loading unit 70.

When the consumables 30 are installed on the installing unit 710, the clamping member 321 of the fixing member 30 will enter the first groove 780 and cooperate with the first groove 780 to prevent the consumable 30 from detaching from the loading unit 70.

The multiple consumables 30 are installed on the loading unit 70 to form a combined body 700. The packaging assembly includes a combined body 700 and an outer packaging unit 200. The outer packaging unit 200 has a receiving unit 2001, and the receiving unit 2001 can at least accommodate at least a part of the combined body 700 formed by the consumables 30 and the loading unit 70. In this embodiment, the outer packaging unit 200 has the receiving unit 2001, and the receiving unit 2001 can accommodate a small part of the combined body 700. The loading unit 70 is used as a part of an outer package.

The outer packaging unit 200 includes the receiving unit 2001, an opening 200*b*, a first side surface 200*c*, a second side surface 200*d*, an extending unit 280, and a protrusion 290 provided on the extending unit 280. The first side surface 200*c* and the second side surface 200*d* are opposite to each other. The extending unit 280 extends from the first side surface 200*c*. When the combined body 700 is installed on the outer packaging unit 200, the protrusion 290 is fit to the second groove 790 to fix the outer packaging unit 200 and the combined body together.

A buckle structure or a rotational connection structure can be provided between the second side surface 200*d* and the loading unit 70. When the buckle structure is provided between the second side 200*d* and the loading unit 70, the combined body 700 is installed to the outer packaging unit 200 along the +Z axis direction, while the protrusion 290 is fit to the second groove 790. When the rotating connection structure is provided between the second side surface 200*d* and the loading unit 70, as shown in FIG. 15, the combined body 700 and the outer packaging unit 200 are rotatably installed with the rotating connection position as a fulcrum, while the protrusion 290 is fit to the second groove 790.

The other parts of the embodiment are consistent with Embodiment 2.

Embodiment 5

On the basis of Embodiment 1 to Embodiment 5, the packaging assembly in each embodiment can include a protection unit, and the provided protection unit can be provided at the outer packaging unit. The protection unit covers at least a part of the operation window and prevent the receiving unit from communicating with the exterior. For example, the protection unit covers at least the operation window, completely prevent the receiving unit from communicating with the exterior.

For example, for the provided protection unit, in order to implement limiting the communication between the inside and the exterior, the provided protection unit can be a protective film, which can be detachably connected to the outer packaging unit and/or the consumable. The protective film can be waterproof, dust-preventable, and prevent air circulation to seal the connection of the corresponding operation windows or the supply ports. In order to ensure the sealing effect of the protective film, and to facilitate the operation of the user and facilitate the opening and sealing of the corresponding opening, the protective film can be adhesively connected. The adhesive material can be disposable or recyclable. When reseing or rewriting the chip, the protective film is torn off, and then the chip is operated through the operation window. After such operation is completed, the operation window is covered with viscous material.

Figure 16:
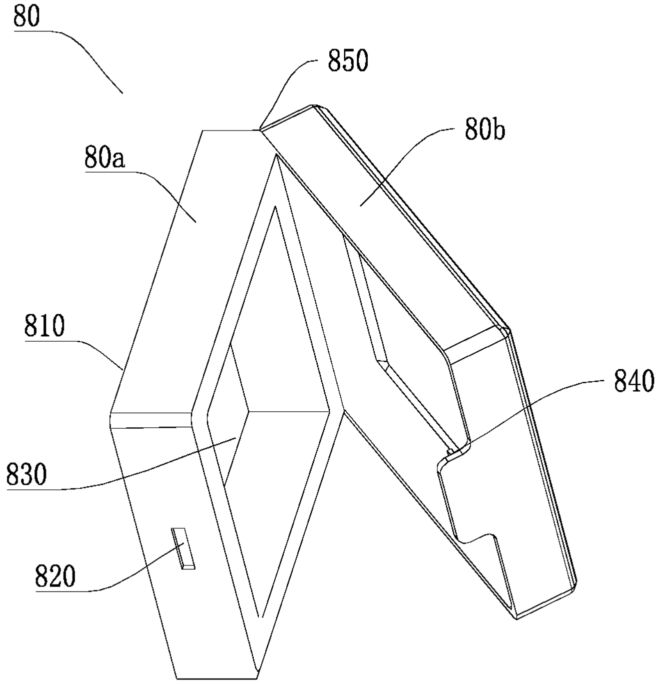
FIG. 16 is a structural diagram of a protection unit according to Embodiment 5.

This embodiment also provides another protection unit, as shown in FIG. 16, which is a schematic diagram of a structure of the protection unit. The following takes the protection unit 80 being provided at the operation window as an example. The protection unit 80 includes an upper cover 80*b* and a lower cover 80*a* which are fit to each other. The lower cover 80*a* is fixedly connected to the outer packaging unit. The upper cover 80*b* can move with respect to the lower cover 80*a* such that the lower cover 80*a* can move to cover or to open the operation window. For example, the lower cover 80*a* is fixedly/adhesively connected around a side wall of the corresponding operation window at the fixing position 810. The lower cover 80*a* has a through hole 830, and the through hole 830 is at least partially overlapped with the opening of the operation window. For example, the through hole 830 completely covers the operation window. The lower cover 80*a* is rotatably connected to the upper cover 80*b* through a shaft 850, such that the upper cover 80*b* can rotate with respect to the lower cover 80*a* to cover the through hole 830 to make the upper cover 80*b* seal the operation window, or such that the through hole 830 is opened to make the through hole 830 and the operation window communicate with the outside through the upper cover 80*b*. In this way, the window 670 exposes at least a part of the chip 330. Operations such as upgrading, resetting, correcting, replacing, can be performed on the chip 330 without unpackaging the packaging assembly.

For example, in order to achieve a better sealing and communication effect and facilitate operation, one of the upper cover 80*b* and the lower cover 80*a* is provided with a buckle unit 820, and the other one of the upper cover 80*b* and the lower cover 80*a* is provided with a buckle position 840. The engagement of the buckle unit 820 and the buckle position 840 enables the upper cover 80*b* to seal the through hole 830, and the disengagement between the buckle unit 820 and the buckle position 840 enables the upper cover 80*b* to rotate with respect to the lower cover 80*a* to open the through hole 830. That is, according to requirements, when it is required to operate the internal chip, the user only needs to disengaged the buckle portion 820 from the buckle position 840, and then manually rotate the upper cover 80*b* to make the operation window expose the chip 330.

It should be emphasized herein that other forms of cooperation can also be adopted for the matching structure of the set protection unit, which is not limited herein.

The above descriptions are only some embodiments of the present disclosure, and are not intended to limit the present disclosure. For those skilled in the art, various modifications and variations of the present disclosure can be made. Any modification, equivalent replacement, improvement, etc. made within the principle of the present disclosure shall be included within the protection scope of the present disclosure.

What is claimed is:

1. A packaging assembly, comprising:

an outer packaging unit;

at least one to-be-packaged unit; and a loading unit configured to accommodate the at least one to-be-packaged unit to limit movement of the at least one to-be-packaged unit with respect to the loading unit, wherein the outer packaging unit comprises a receiving unit capable of receiving at least a part of the loading unit and the at least one to-be-packaged unit which are fit to each other;

wherein one of the at least one to-be-packaged unit comprises a chip, the loading unit is provided with a window configured to expose at least a part of the chip, the outer packaging unit further comprises an operation window, the operation window is configured to expose at least a part of the chip, and the chip and/or one of the at least one to-be-packaged unit is capable of being operated through the operation window from an exterior of the outer packaging unit;

and wherein at least a part of the chip comprises a terminal, and the terminal is capable of abutting against a contact pin of an operator through the window and the operation window to upgrade the chip in response to a restoring procedure or a correcting procedure executed by the operator.

2. The packaging assembly according to claim 1, wherein the at least one to-be-packaged unit comprises two or more to-be-packaged units that are detachably connected to the loading unit, and the loading unit is configure to limit the movement of the two or more to-be-packaged units with respect to the loading unit.

3. The packaging assembly according to claim 2, wherein the loading unit comprises a partition, and when the two or more to-be-packaged units are accommodated in the loading unit, the partition is configured to separate every two adjacent to-be-packaged units of the two or more to-be-packaged units.

4. The packaging assembly according to claim 2, wherein the loading unit further comprises an installing unit, wherein the installing unit is capable of being fixedly connected to the two or more to-be-packaged units and is configured to limit movement of the two or more to-be-packaged units.

5. The packaging assembly according to claim 4, wherein the installing unit is an installing groove provided in the loading unit, wherein one of the installing groove and one to-be-packaged unit of the two or more to-be-packaged units is provided with a protrusion, and another one of the installing groove and the one to-be-packaged unit is provided with a groove, and the protrusion and the groove are snap-fit together to limit the movement of the two or more to-be-packaged units with respect to the loading unit when the two or more to-be-packaged units are fit to the loading unit.

6. The packaging assembly according to claim 4, wherein the outer packaging unit comprises a first outer packaging member and a second outer packaging member;

the first outer packaging member and the second outer packaging member are detachably connected to each other to form the receiving unit;

the first outer packaging member comprises a first operation window, and the second outer packaging member comprises the operation window; and when the first outer packaging member is fit to the second outer packaging member, the first operation window and the second operation window are at least partially overlapped with each other.

7. The packaging assembly according to claim 1, further comprising:

a protection unit covering at least a part of the operation window and configured to prevent the receiving unit from communicating with the exterior.

8. The packaging assembly according to claim 7, wherein the protection unit comprises an upper cover and a lower cover which are fit to each other, wherein the lower cover is fixedly connected to the outer packaging unit, and the upper cover is capable of moving with respect to the lower cover in such a manner that the upper cover is capable of moving to cover or to open the operation window.

9. The packaging assembly according to claim 1, wherein the outer packaging unit comprises a first outer packaging member and a second outer packaging member;

the first outer packaging member and the second outer packaging member are detachably connected to each other to form the receiving unit;

the first outer packaging member comprises a first operation window, and the second outer packaging member comprises the operation window; and when the first outer packaging member is fit to the second outer packaging member, the first operation window and the second operation window are at least partially overlapped with each other.

10. The packaging assembly according to claim 1, further comprising:

a buffer member provided between the outer packaging unit and the at least one to-be-packaged unit.

* * * * *